US010740002B1

(12) United States Patent
Aden et al.

(10) Patent No.: US 10,740,002 B1
(45) Date of Patent: Aug. 11, 2020

(54) SYSTEM STATUS LOG

(71) Applicant: Arista Networks, Inc., Santa Clara, CA (US)

(72) Inventors: Charles Melvin Aden, Santa Clara, CA (US); Robert J. Marinelli, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 39 days.

(21) Appl. No.: 15/147,756

(22) Filed: May 5, 2016

(51) Int. Cl.
*G06F 3/06* (2006.01)
*G06F 13/16* (2006.01)
*G06F 13/42* (2006.01)

(52) U.S. Cl.
CPC .......... *G06F 3/0611* (2013.01); *G06F 3/0619* (2013.01); *G06F 3/0659* (2013.01); *G06F 3/0679* (2013.01); *G06F 13/1673* (2013.01); *G06F 13/4282* (2013.01)

(58) Field of Classification Search
CPC .... G06F 3/0611; G06F 3/0619; G06F 3/0679; G06F 13/4282
See application file for complete search history.

(56) References Cited

U.S. PATENT DOCUMENTS

| | | | | |
|---|---|---|---|---|
| 6,269,412 B1* | 7/2001 | Liu | ............................ | G06F 1/20 710/19 |
| 8,127,059 B1* | 2/2012 | Carr | ...................... | G06F 13/387 710/74 |
| 8,713,391 B1* | 4/2014 | Azimi | .............. | G01R 31/31705 714/733 |
| 2002/0184410 A1* | 12/2002 | Apel | ..................... | G06F 9/4411 710/5 |
| 2007/0220362 A1* | 9/2007 | Williams | ................ | G06F 11/28 714/45 |
| 2008/0177926 A1* | 7/2008 | Minami | .............. | G06F 11/0748 710/316 |
| 2009/0147796 A1* | 6/2009 | Chow | .................. | H04L 47/6215 370/413 |
| 2010/0082902 A1* | 4/2010 | Ito | ......................... | G06F 3/0622 711/114 |
| 2010/0242025 A1* | 9/2010 | Yamazaki | ........... | G06F 11/3476 717/127 |
| 2010/0325352 A1* | 12/2010 | Schuette | ............... | G06F 3/0613 711/103 |
| 2012/0072641 A1* | 3/2012 | Suzuki | .................. | G06F 3/0608 711/103 |

(Continued)

*Primary Examiner* — Tim T Vo
*Assistant Examiner* — Harry Z Wang
(74) *Attorney, Agent, or Firm* — Fountainhead Law Group P.C.

(57) ABSTRACT

An apparatus for recording data received in serial form is provided. The apparatus includes a data logging port, an external access port, a first memory, and a command memory and a state machine executing on a processor internal to the apparatus, that writes the data, received in serial form through the data logging port, to the first memory while locking out access to the first memory via the bus interface and the command memory. The bus interface and the command memory are configured to read the first memory, when not locked out, in accordance with a command placed in the command memory through the bus interface. A method performed by the apparatus is also provided.

20 Claims, 6 Drawing Sheets

(56) References Cited

U.S. PATENT DOCUMENTS

| | | | |
|---|---|---|---|
| 2014/0143464 A1* | 5/2014 | Natrajan | G06F 13/4027 |
| | | | 710/117 |
| 2015/0082071 A1* | 3/2015 | Kim | G06F 1/206 |
| | | | 713/340 |
| 2016/0253370 A1* | 9/2016 | Song | G06F 9/524 |
| | | | 707/704 |

* cited by examiner

SYSTEM STATUS LOG

BACKGROUND

Network components such as switches, and various further types of electronic components, experience field failures and are returned for repair, replacement or analysis. Console data from a switch, or, generally, data from various types of electronic components, is useful in diagnosing field failures. Operating systems such as Linux may offer a logging feature and it is common to write software to write logs to nonvolatile memory such as flash. However, software-based logging is vulnerable to failure of a CPU (central processing unit), and the same circumstances that could crash a network switch or other electronic component could also crash the CPU that is responsible for executing the logging. Writing to flash memory requires a working kernel along with a method and working flash device. The kernel could be unable to write for many software reasons and long operating systems delays may cause the writes to be lost due to system errors that occur later. To use flash properly, blocks of data must be written at one time, thus write latency is significant and may cause the most recent data, perhaps even the cause of the failure, to be missed. In addition, slow writes to flash memory consume valuable system resources and burden a CPU or a filesystem. It is within this context that the embodiments arise.

SUMMARY

In some embodiments, an apparatus for recording data received in serial form is provided. The apparatus includes a data logging port, an external access port, a first memory, and a command memory and a state machine executing on a processor internal to the apparatus, that writes the data, received in serial form through the data logging port, to the first memory while locking out access to the first memory via the bus interface and the command memory. The bus interface and the command memory are configured to read the first memory, when not locked out, in accordance with a command placed in the command memory through the bus interface.

In some embodiments, a recorder is provided. The recorder includes an external access port, a data logging port, a first memory, and a command memory coupled to the external access port. The recorder includes a logger, that writes data, received through the data logging port, to the first memory, and a lockout mechanism that directs the logger to write the data to the first memory while locking out access through the external access port, and enables read access to the first memory through the external access port and the command memory while locking out the logger writing the data to the first memory. The lockout mechanism is responsive to values in the command memory.

In some embodiments, a method performed by a recorder for recording data received in serial form is provided. The method includes receiving the data, in serial form, into a data logging port and writing the data received through the data logging port into the first memory, with read access to the first memory through the external access port and the command memory locked out, in accordance with a first value in the command memory. The method includes reading the first memory, via the external access port and the command memory, with the writing the data received through the data logging port into the first memory disabled, in accordance with a second value in the command memory.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Various embodiments of a black box recorder that writes a system status log are disclosed herein. Embodiments are suitable for a network switch or router, or other network components that switch, route or otherwise handle packets, and may be suitable for further electronic components. Some embodiments of the black box recorder record console data, which can provide valuable information about settings and operation of a network device. Console data may include commands sent over a command-line interface from a remote console or management station. Some embodiments can also record information such as line power failures, hardware shutdowns, fan speeds, voltages and currents, system temperatures, software commands received, etc., and/or can add timestamps to the log. Some of these embodiments are specific to serial data, others could be used for parallel data. Some of these are specific to memory structures such as FIFOs (first-in first-out) and a circular buffer, others can use various types of memory structures as further described below. Embodiments can be implemented in hardware, firmware, software executing on a processor internal to the recorder, or combinations thereof. Some versions are implemented on a programmable logic device (PLD) or application-specific integrated circuit (ASIC), or another type of integrated circuit. The various embodiments intercept console writes, e.g., of a network switch, or other data, e.g., of an electronic component, directly in hardware, so that the log is immediately saved even if the software for the network switch or other electronic component crashes just after outputting a character or other form of data. Functioning in the black box recorder does not depend on continued or correct operation of a processor or other component or circuitry in the network switch or other electronic component that has console data or other data that is being logged by the black box. Specific pinouts for integrated circuits and wiring for connectivity, and packaging, etc., is implementation dependent and readily devised in keeping with the teachings herein.

Figure 1:
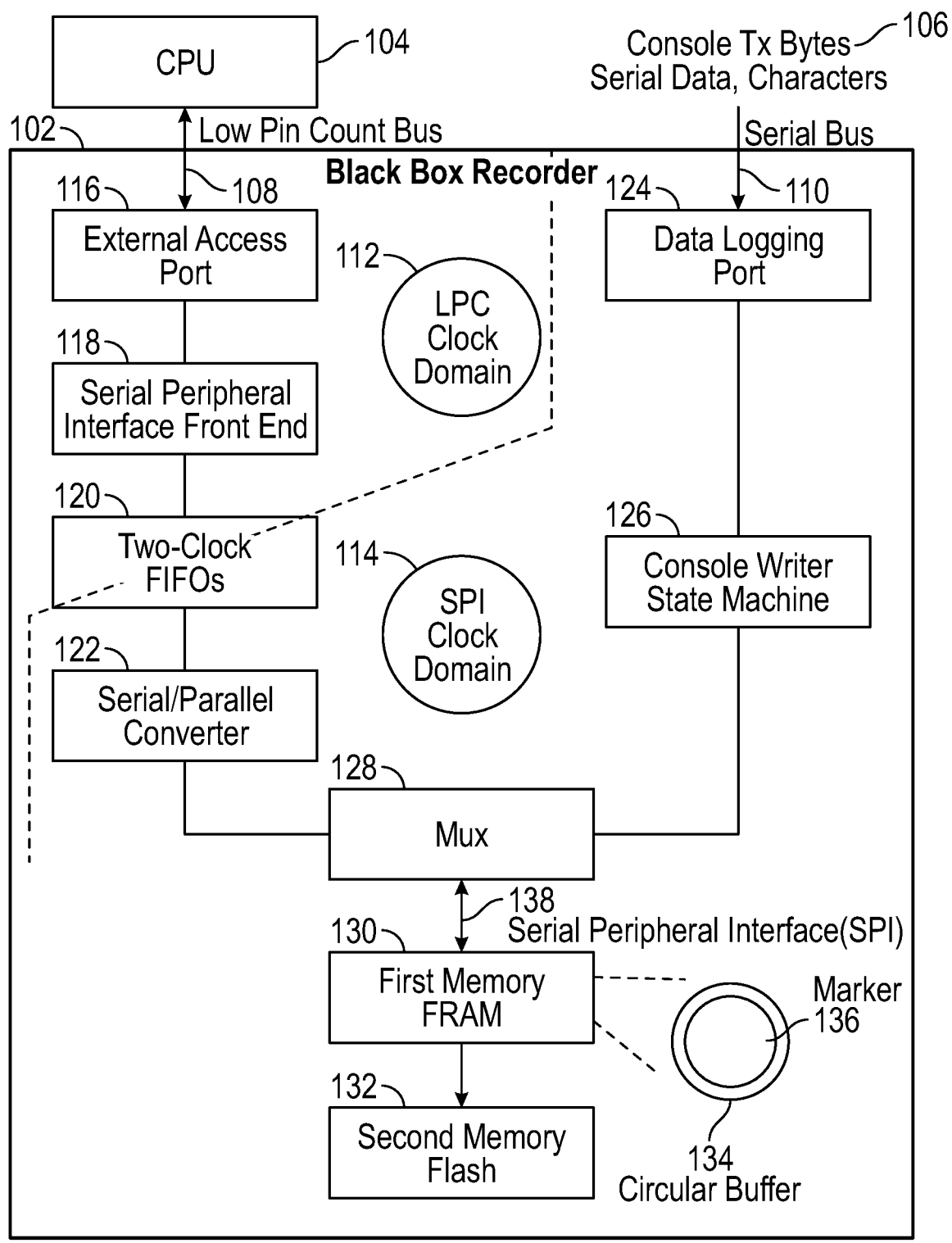
FIG. 1 is a block diagram of an embodiment of a black box recorder in accordance with some embodiments.

FIG. 1 is a block diagram of an embodiment of a black box recorder 102 in accordance with the present disclosure. This embodiment is specific to recording serial data, for example the characters of console transmit bytes 106 from a network switch or other electronic component for which is important to log the serial data. Serial data arrives to the black box recorder 102 on the serial bus 110 into the data logging port 124. For example, the serial data could be tapped from a serial line or port of a network switch or other electronic component. The data logging port 124 is connected to a console writer state machine 126, which could be implemented using clocked flip-flops and state machine logic in hardware, or in firmware, or software executing on a processor internal to the black box recorder 102, or combinations thereof, in various embodiments. The console writer state machine 126 functions to pull in the serial data, convert and format the serial data to characters, and present the formatted data to the multiplexer 128 for writing, when enabled, to the first memory 130.

In the embodiment shown, the first memory 130 is ferroelectric random access memory (FRAM or FeRAM), with a circular buffer 134, although other types of memory (such as flash or battery backed up RAM) and other data structures (e.g., buffers, stacks, pages) could be used. FRAM is advantageously used in some embodiments, because the limited lifecycle of flash could be consumed recording logs that do not immediately precede a system failure. FRAM does not suffer from premature failure due to constant use. Battery backed up RAM could also be used, as it would also not suffer from premature failure, but this may add to complexity and have limited life of a battery. Many available application-specific integrated circuits (ASICs) and programmable logic devices (PLD) have small amounts of flash memory on-chip, but this may not be large enough for logging. Thus, a first memory 130 that is external to an ASIC or PLD may be preferable. FRAM is available in various sizes, and in serial and parallel interfaces. The embodiment shown in FIG. 1 uses a serial peripheral interface (SPI) 138, and further embodiments could use a parallel interface, each with a suitable type of FRAM or other type of memory.

In the embodiment shown, there is a second memory 132, and it is flash memory. Some embodiments could omit the second memory 132, and other embodiments could use other types of memory, preferably nonvolatile memory such as battery backed up RAM, MRAM (magnetoresistive random access memory) or even EPROM (electrically programmable read-only memory, usually ultraviolet erasable) or other type of EEPROM (electrically erasable programmable read-only memory) besides flash. The recorder 102 writes the contents of the first memory 130 into the second memory 132, for example as directed by a command and/or as directed by the console writer state machine 126. In most embodiments that have a second memory 132, the second memory is larger than the first memory 130, so as to allow multiple copies of the contents of the first memory 132 be written to the second memory 132. It is advantageous to use different types of memory for the first memory 130 and the second memory 132. The first memory can be of a type of non-volatile memory that is quick to write and does not require overhead for erasure. FRAM fits this description. In some embodiments, the second memory can be of a type of non-volatile memory that has high density and is suitable for transfers of larger amounts of information, e.g., page writes and page reads. FLASH fits this description.

A CPU (central processing unit) 104 or other device external to the black box recorder 102 can communicate with internal features of the black box recorder 102, through the low pin count (LPC) bus 108 and the external access port 116 in the embodiment shown. Further embodiments could use other types of ports or busses, and serial or parallel communication. Here, the external CPU 104 or other device can write commands, or in some embodiments data, and/or read data of the first memory 130 and/or second memory 132, by writing and reading the two-clock FIFOs (first-in first-out memories) 120, which are accessed through the external access port 116 and the serial peripheral interface front end 118. These contain logic and associated circuitry for receiving commands or data from the CPU 104 according to the pin arrangement on the low pin count bus 108 and formatting or applicable standards, and converting or otherwise preparing the commands or data for clocking into the two-clock FIFOs 120. These also contain logic and associated circuitry for clocking data of the first memory 130 and/or second memory 132 into and out of the two-clock FIFOs 120 for reading by the CPU 104 through the serial peripheral interface front end 118 and external access port 116.

Because, in the embodiment shown in FIG. 1, the two-clock FIFOs 120 have data in parallel form, and the first memory has a serial peripheral interface 138, the data is converted from parallel form in the FIFOs to serial form for the first memory 120, for writing data from the two-clock FIFOs 120 to the first memory 130. This is done by the serial/parallel converter 122, which also converts data in serial form, from the first memory 130, to parallel form for the two-clock FIFOs 120, for reading data from the first memory 130 to the two-clock FIFOs 120.

The multiplexer 128 is operated to select the data from the data logging port 124 for writing to the first memory 130, data from the two-clock FIFOs 120 for writing to the first memory 130 (in some embodiments, and not in others), and data from the first memory 130 for reading out to the external access port via the serial/parallel converter 122 and the two-clock FIFOs 120. In a further embodiment, data could be selected by the multiplexer 128 for reading from the first memory 130 out through the data logging port 124, for example for diagnostics or a failure of the external access port 116, or even in an embodiment that has only a data logging port 124 and no other external access port 116.

Clock domain differences are handled as described herein. In the embodiment shown in FIG. 1, the external access port 116, the serial peripheral interface front end 118 and a portion of the two-clock FIFOs 120 operate in an LPC clock domain 112, with a clock frequency applicable to data coming and going on the low pin count bus 108. A further portion of the two-clock FIFOs 120, and remaining circuitry on the black box recorder 102 (e.g., the serial/parallel converter 122, the console writer state machine 126, the serial peripheral interface 138) operate in the SPI clock domain 114. The multiplexer 128 could be asynchronous, or clocked with operation in the SPI clock domain 114. In some embodiments, the first memory 130 and/or the second memory 132 operate in the SPI clock domain 114, but these could be asynchronous, or clocked with another clock or clocks, in various embodiments. The data logging port 124 could operate in accordance with the serial bus 110, and then be synchronized to the console writer state machine 122 in the SPI clock domain 114 various clocking schemes and associated circuitry to operate in the LPC clock domain 112 and the SPI clock domain 114 are readily devised. As a specific example, the two-clock FIFOs 120 have portions and interfaces that are clocked by the clock of the LPC clock domain 112 and coupled to the serial peripheral interface front end 118 and external access port 116, and further portions and interfaces that are clocked by the clock of the SPI clock domain 114 and coupled through the multiplexer 128 to the serial peripheral interface 138 and to the first memory 130.

Figure 3A:
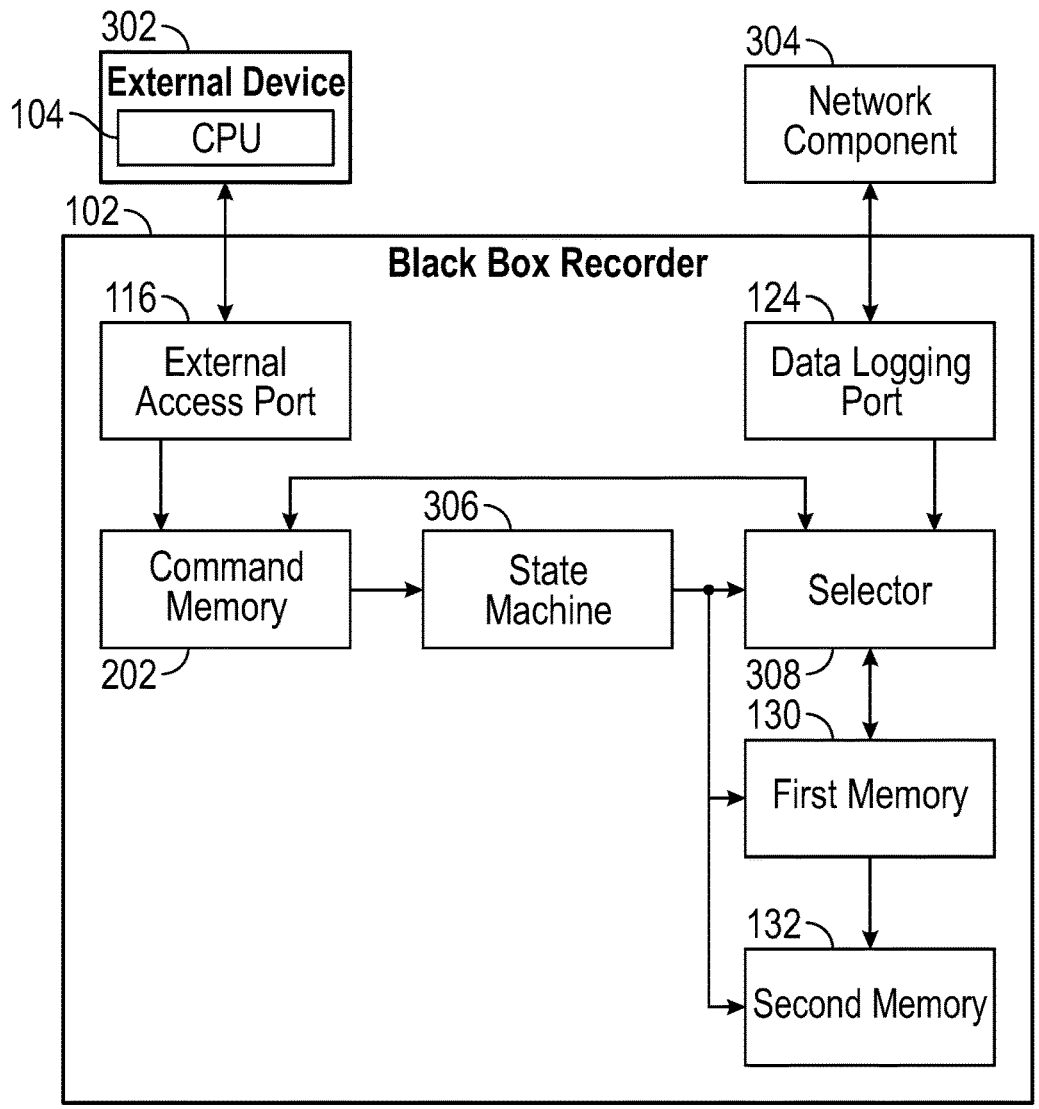
FIG. 3A is a block diagram of a further embodiment of the black box recorder of FIG. 1 in accordance with some embodiments.

There are many possibilities for implementation of the multiplexer 128. This could be done with unidirectional multiplexers, bidirectional multiplexers, steering logic, asynchronous or synchronous logic or combination thereof, buffering, gating, etc. In some embodiments, data logging is unidirectional in that the data from the data logging port 124 is to be written into the first memory 130, and not read out by that same path, and the multiplexer 128 can be implemented accordingly. In some embodiments, the first memory 130 and/or second memory 132 can only be read out through the external access port 116, but not written to by that path, and the multiplexer 128 can be implemented accordingly. In other embodiments, the first memory and/or second memory 132 can be read from and written to through the external access port 116, and portions of the multiplexer 128 can be designed to be bidirectional or paired unidirectional, accordingly. Some embodiments of the multiplexer 128 are shown in FIGS. 3A-4, and further embodiments can be devised.

In addition, there are many possibilities for implementation of the first memory 130 and second memory 132. In the embodiment shown in FIG. 1, the first memory has a circular buffer 134, and data from the serial peripheral interface 138 is written to successive portions of the circular buffer, as marked by a marker 136. In some versions, when the marker 136 has completed one revolution around the circular buffer, the contents of the first memory 130 are written to the second memory 132. In this manner the most recent data from the data logging port 124 is written into the first memory 130, and data is logged from the first memory 130 into the second memory 132 at intervals, for a more complete record. In other versions, the contents of the first memory 130 are written to the second memory 132 only when directed by command(s).

In a further embodiment, the recorder 102 accepts further information into the data logging port 124 and can log other information such as line power failures, hardware shutdowns, fan speeds, voltages and currents, system temperatures, software commands received, etc. Some versions have timestamps that are added to the log. Some versions of the recorder 102 are implemented in hardware only, and have no software and no CPU inside the recorder 102.

Figure 2:
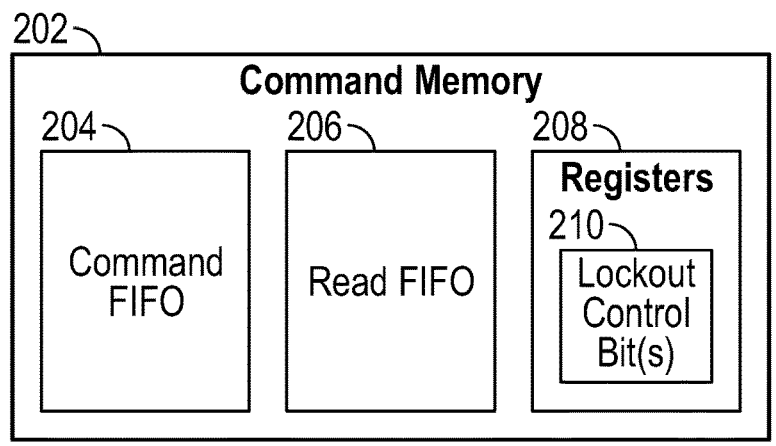
FIG. 2 is a block diagram of a command memory with registers and two FIFO (first-in first-out) memories, suitable for versions of the black box recorder of FIG. 1 in accordance with some embodiments.

FIG. 2 is a block diagram of a command memory 202 (also referred to as a command processor) with registers 208 and two FIFO (first-in first-out) memories 204, 206, suitable for versions of the recorder 102 of FIG. 1. Registers 208 have addresses and various bits, including one or more lockout control bits 210 that control or direct access to the first memory 130 and/or the second memory 132. A command FIFO 204 is written via the external access port 116 and the serial peripheral interface front end 118, so that the external CPU 104 or other device external to the black box recorder 102 can place commands into the recorder 102. These commands are then interpreted by the console writer state machine 126 and/or the multiplexer 128. In some embodiments, the external CPU 104 or other device can write data into the command FIFO 204, which, when enabled by an appropriate command and address in the command FIFO 204 and/or value in the lockout control bit(s) 210 in the registers 208, is written via the serial parallel converter 122 and the multiplexer 128 into the first memory 130 and/or the second memory 132. A read FIFO 206 is read via the external access port 116 and the serial peripheral interface front end 118, so that the external CPU 104 or other device external to the recorder 102 can read data from the first memory 130 and/or the second memory 132. Implementation of the command FIFO 204, the read FIFO 206, and the registers 208 of the command memory 202 should follow the appropriate clocking or circuitry and interfaces in the LPC clock domain 112 and SPI clock domain 114.

Various memory maps for the registers 208 are readily developed. The suggested usage model is to have software of an external CPU 104 or external device 302 only read the logs, and hardware of the black box recorder 102 only write the logs. To avoid hazards, the logger should be turned off during CPU accesses, by making sure that the logger control bit, for example one of the lockout control bit(s) 210 is set to the appropriate level. With such an implementation, there need be no arbitration between the logging state machine and access by an external CPU 104.

One register map for one embodiment is as follows. The circular buffer 134 in the first memory 130 is accessible for writing, via the read FIFO 206, and for writing in some embodiments, via the command FIFO 204. A scratchpad register for testing is available at a first register address. The command FIFO 204 is available at a second register address. Various commands for the command FIFO 204 are defined for specified values, to read from specified addresses or the entirety of the first memory 130, and in some embodiments the second memory 132, into the read FIFO 206. In some embodiments, commands are defined for writing specified amounts and values of data to specified addresses in the first memory 130. Further commands are defined for writing from the first memory into the second memory 132. The read FIFO 206 is available at a third register address. Each read of the read FIFO 206 pops the next read byte off of the read FIFO 206. A control register for the serial peripheral interface 138 is available at a fourth register address. This includes status bits, which are readable and that can be written to clear, in some embodiments. A logger control register is available at a fifth register address. This includes a lockout control bit 210 that can be written to run or pause the logger 402 (see FIG. 4) or console writer state machine 126 (see FIG. 1). Reading that same bit tells the status of the logger as running or not running.

FIGS. 3A-3C, 4 and 5 show various embodiments of the black box recorder 102. It should be appreciated that further embodiments of the recorder 102 can use portions from one, two, three, or more of these in various combinations. For example, the various types of selection depicted in FIGS. 3A-3C can be used for the multiplexer 128 in FIG. 1. The embedding of a state machine 502 in a UART (universal asynchronous receiver transmitter) depicted in FIG. 5 can be used for a state machine shown in another embodiment. Serial busses, interfaces and devices can be swapped for parallel ones, and vice versa, or combined together, in various embodiments. Modules or interfaces can be combined, integrated with or moved to other blocks, etc. Various types of memory and structures in memory can be used in any of the embodiments. Versions and variations of the lockout mechanism 404 can be implemented in the various embodiments.

FIG. 3A is a block diagram of a further embodiment of the black box recorder 102 of FIG. 1. An external device 302 (i.e., external to the black box recorder 102) with a CPU 104 communicates through the external access port 116 of the black box recorder 102 to the command memory 202 (also referred to as a command processor). The command memory 202 couples to and directs a state machine 306 and a selector 308. A network component 304, which is being data logged, connects to the data logging port 124 of the black box recorder. Directed by the command memory 202 and the state machine 306, the selector 308 selects whether the data logging port 124 or the command memory 202 is allowed access to the first memory 130 and/or the second memory 132. For example, this could be under control of the lockout control bit(s) 210 shown in the command memory 202 in FIG. 2. In one version, only one of these is allowed access to the first memory 130 and/or the second memory 132 at a time, with access controlled by the selector. The access to the first memory 130 and/or the second memory 132 by the external access port 116 and the command memory 202 is locked out while data logging of data from the data logging port 124 into the first memory 130 is in progress. And, the data logging is locked out while the external device 302 accesses the first memory 130 and/or the second memory 132 via the external access port 116 and the command memory 202.

Figure 3B:
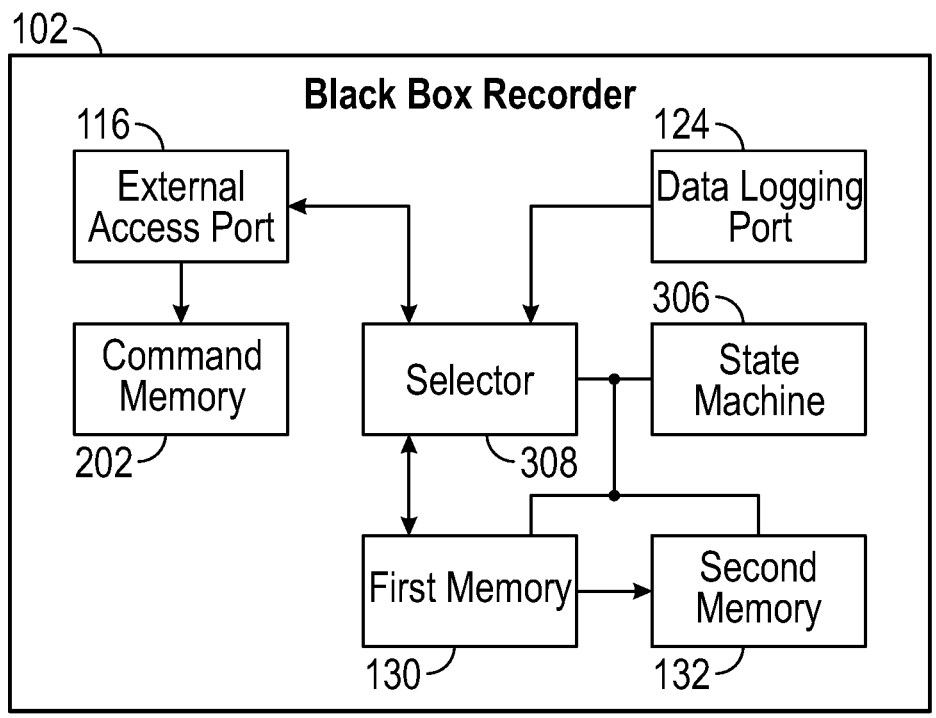
FIG. 3B is a block diagram of a variation of the black box recorder of FIG. 3A in accordance with some embodiments.
Figure 4:
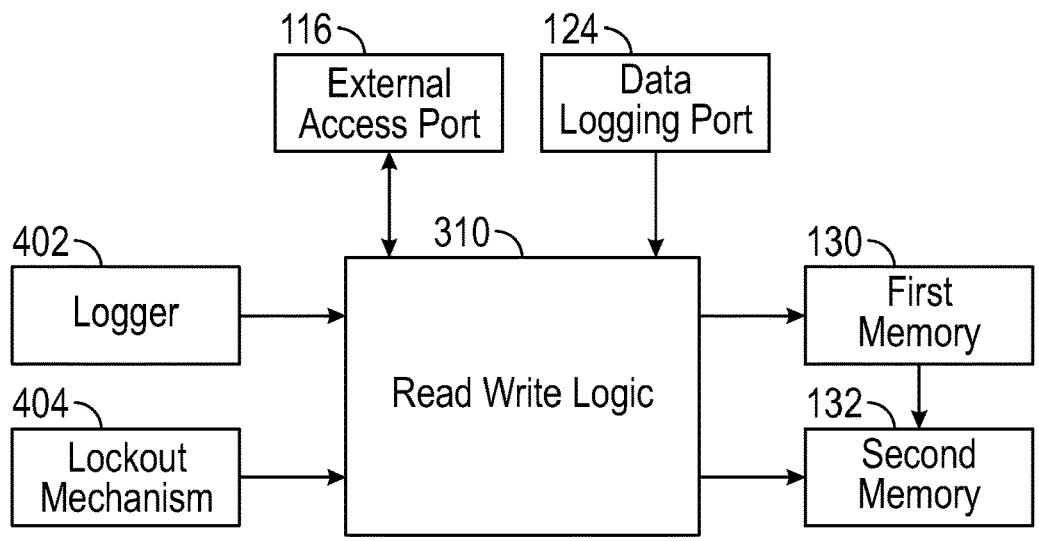
FIG. 4 is a block diagram depicting a logger, a lockout mechanism and read write logic suitable for embodiments of the block box recorder of FIG. 1 in accordance with some embodiments.

FIG. 3B is a block diagram of a variation of the black box recorder 102 of FIG. 3A. Here, the state machine 306 is shown coupled to and controlling the selector 308, the first memory 130 and the second memory 132. The selector 308 selects whether the external access port 116 or the data logging port 124 has access to the first memory 130 and/or the second memory 132. The external access port 116 is always able to access the command memory 202. In keeping with the variations, the external access port 116 could be a parallel port or a serial port, as could the data logging port 124, in various embodiments.

Figure 3C:
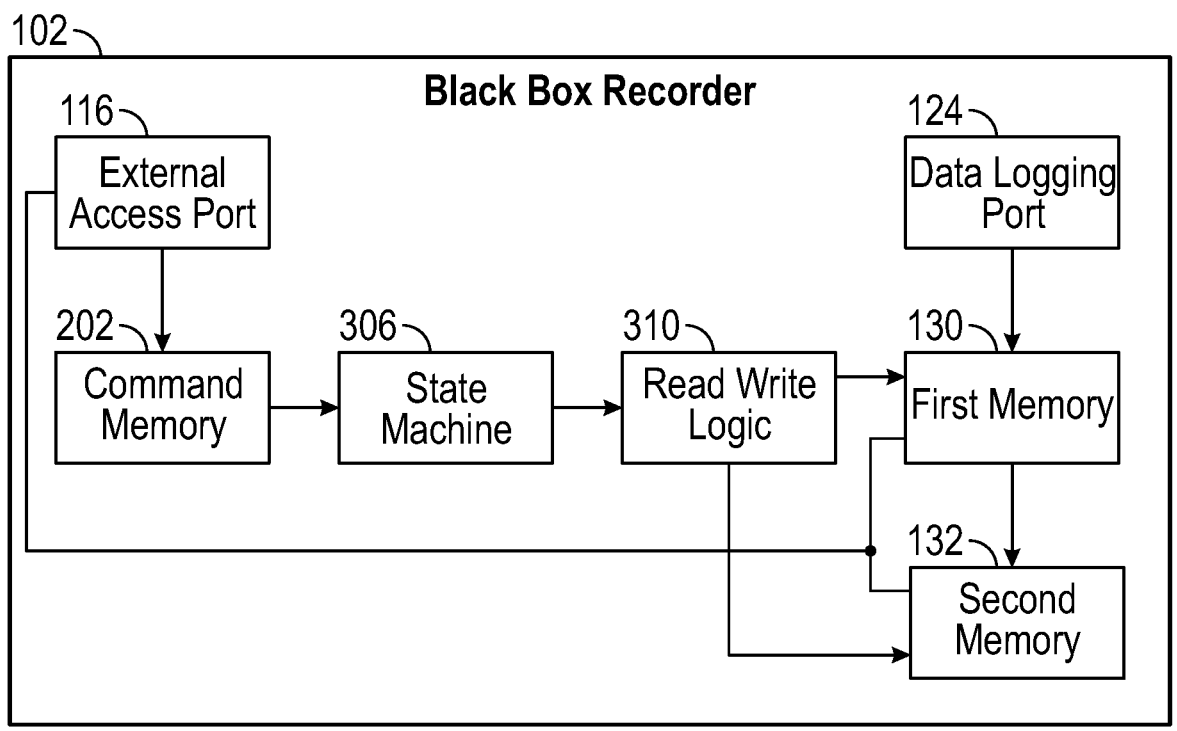
FIG. 3C is a block diagram of a further variation of the black box recorder of FIG. 3A in accordance with some embodiments.

FIG. 3C is a block diagram of a further variation of the recorder 102 of FIG. 3A. The external access port 116 always has access to the command memory 202, which directs operation of the state machine 306. Read and write logic 310 is directed or operated by the state machine 306, to allow read and/or write access to the first memory 130 and/or the second memory 132 through the external access port 116. In a variation, this access could go through the command memory 202, as shown in FIG. 2. Control of the state machine 306 and accesses through the read write logic 310 could be in accordance with the lockout control bit(s) 210 shown in FIG. 2.

FIG. 4 is a block diagram depicting a logger 402, a lockout mechanism 404 and read write logic 310 suitable for embodiments of the recorder 102 of FIG. 1. An external access port 116 and data logging port 124 perform similar functions as in other embodiments. A logger 402 and a lockout mechanism 404 control the read write logic 310, which interfaces to the first memory 130 and the second memory 132. The lockout mechanism 404 allows access to the first memory 130 and/or the second memory 132 to only one of the external access port 116 or the data logging port 124 at a time. For example, the logger could be implemented with some or all of the console writer state machine 126, or have additional logic for controlling logging of status as described above with reference to FIG. 1. The lockout mechanism 404 could be implemented with the lockout control bit(s) 210 described with reference to FIG. 2, directly controlling read/write logic 310. Or, the lockout mechanism 404 could be implemented using various states in the console writer state machine 126 of FIG. 2 or one of the other state machines 306 shown in FIGS. 3A-3C. For example, some states associated with logging data appearing at the data logging port 124 could hold one or more outputs disabled so as to disable access through the external access port 116, while other states associated with access through the external access port 116 would hold such output(s) enabled, so as to enable access through the external access port 116 when data logging is not being performed.

Figure 5:
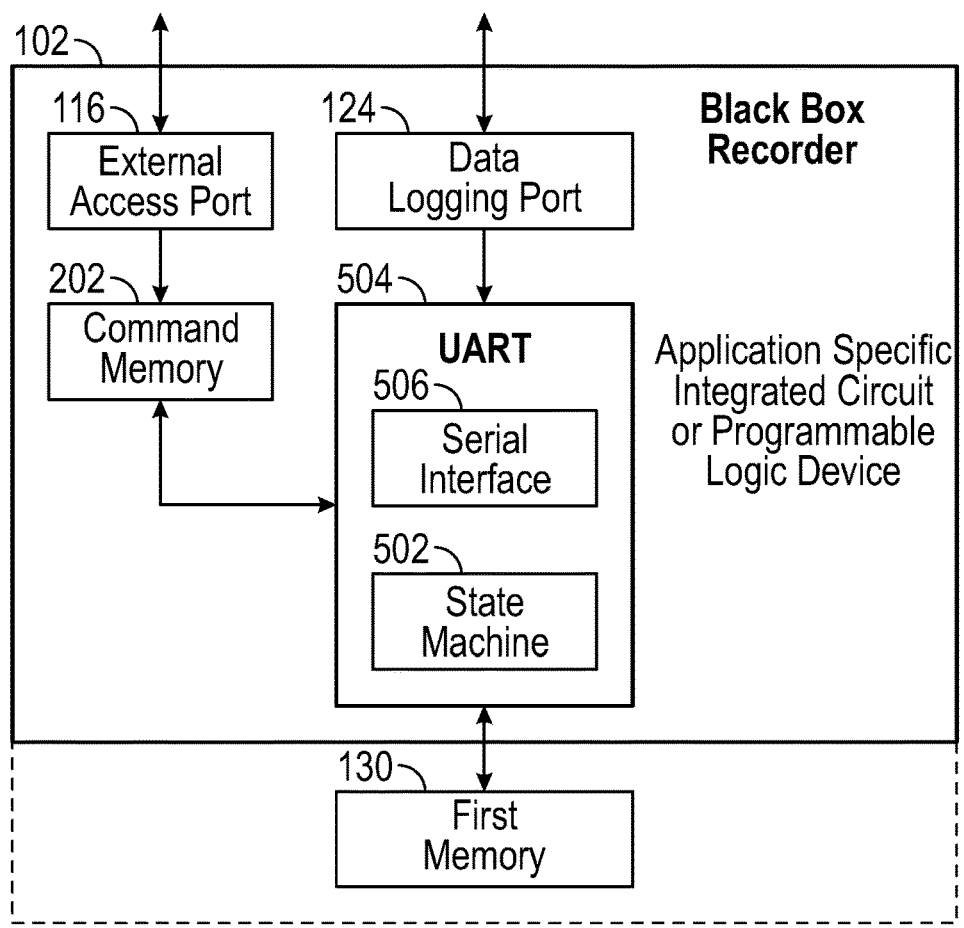
FIG. 5 is a block diagram of a further embodiment of the black box recorder of FIG. 1, with the state machine inside a UART (universal asynchronous receiver transmitter) in accordance with some embodiments.

FIG. 5 is a block diagram of a further embodiment of the black box recorder 102 of FIG. 1, with the state machine 502 inside a UART 504. By implementing the state machine 502 inside the UART 504, a hardware-only machine is created, for data logging the serial data (e.g., the console transmitted bytes 106 of FIG. 1), and that hardware-only machine is immune to CPU and software crashing. The UART 504 with state machine 502 and serial interface 506, the command memory 202, the external access port 116, and the data logging port 124 are implemented on an application specific integrated circuit or programmable logic device, or other type of integrated circuit, in a non-CPU based embodiment. That is, there is no processor on the ASIC, PLD or other integrated circuit, and all logic is hardwired. Alternatively, the state machine 502 could be implemented in firmware on this, or other embodiments. The first memory 130 could be external to the ASIC or PLD or other integrated circuit, or could be integrated with that (as shown by the dashed line), in various embodiments. As with other embodiments, a second memory 132 could be included, and this could be on or external to the ASIC or PLD or other integrated circuit.

Some UARTs can receive and transmit at different frequencies, with receiving controlled by a receive clock, and transmitting controlled by a transmit clock. Some embodiments of the first memory 130 use a serial interface FRAM. Thus, there are some embodiments in which the data is received into the UART 504 in serial form through the data logging port 124 at one baud rate, dependent on the console transmitted bytes 106 that come in over the serial bus 110, and transmitted out of the UART 504 to the serial peripheral interface 138 and the FRAM at another, different baud rate, dependent on the SPI clock domain 114. These baud rates and clocking are applicable to embodiments of the black box recorder 102 shown in FIGS. 1-3C, and the console writer state machine 126 and various state machines 306.

Figure 6:
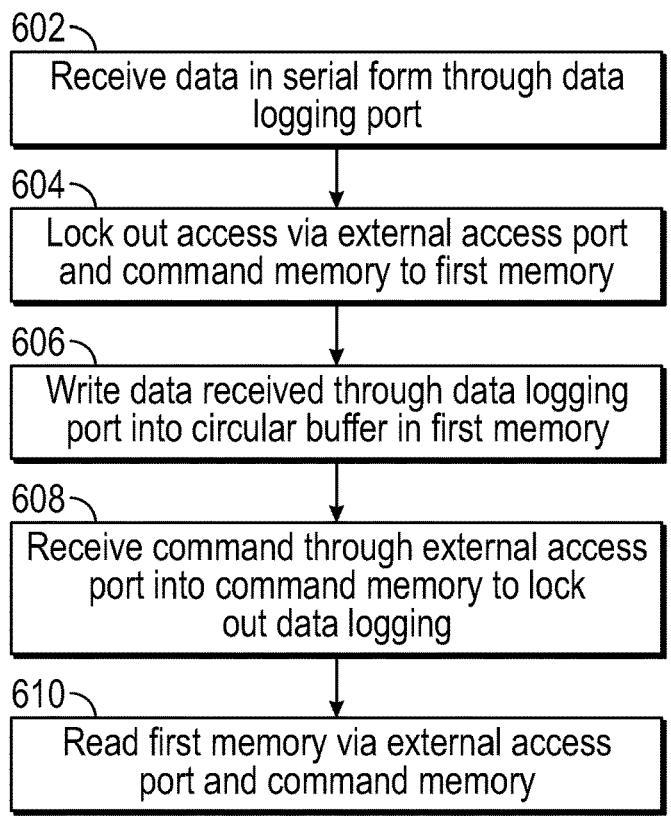
FIG. 6 is a flow diagram of a method for operating a black box recorder, which can be practiced by embodiments of the black box recorder shown in FIGS. 1-5 in accordance with some embodiments.

FIG. 6 is a flow diagram of a method for operating a recorder, which can be practiced by embodiments of the recorder shown in FIGS. 1-5. In an action 602, data is received in serial form through a data logging port. In an action 604, access to a first memory, via the external access port and a command memory, is locked out. This could use the multiplexer of FIG. 1, the lockout control bit(s) of FIG. 2, the selector, the command memory and a state machine 306 as shown in FIGS. 3A-3C, the read/write logic 310 of FIG. 3C, various states of one of the state machines 126, 306, 502 described with reference to FIGS. 1, 3A-3C and 5, and/or the lockout mechanism 404 described with reference to FIG. 4, or combinations or variations thereof.

In an action 606, the data received through the data logging port is written into a circular buffer in the first memory. This is with the access via the external access port locked out. In an action 608, a command is received through the external access port and into the command memory, to lockout data logging. For example, the command could be written into one of the registers 208, with the lockout control bit(s) as shown in FIG. 2. In an action 610, the first memory is read via the external access port and the command memory. This is with the data logging locked out. The reading could occur through the two-clock FIFOs as described in FIG. 1, particularly through the read FIFO shown in FIG. 2.

Figure 7:
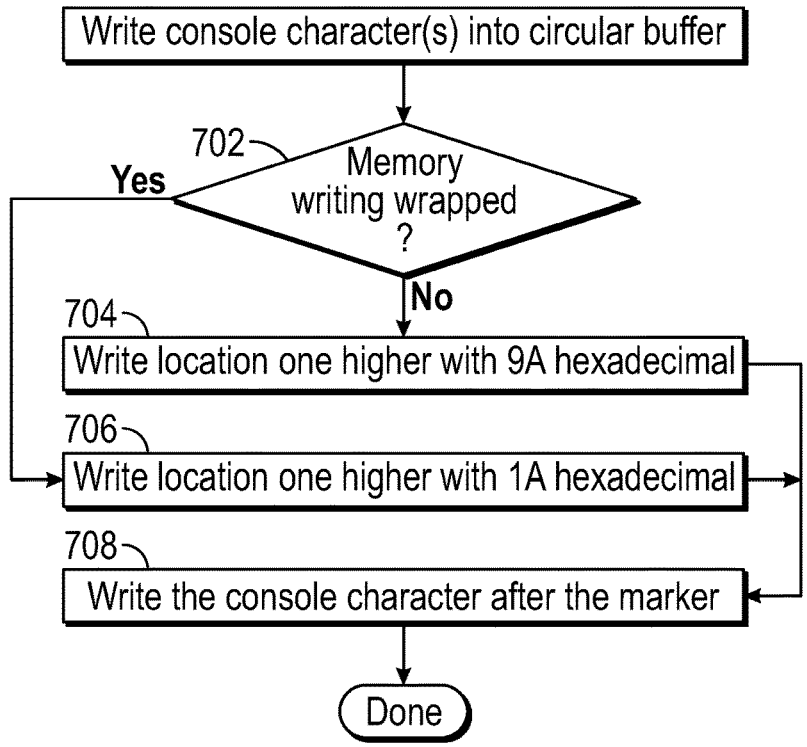
FIG. 7 is a flow diagram of a method for marking a circular buffer, which can be practiced by embodiments of the black box recorder shown in FIGS. 1-5 in accordance with some embodiments.

FIG. 7 is a flow diagram of a method for marking a circular buffer, which can be practiced by embodiments of the recorder shown in FIGS. 1-5. This method allows ready determination of whether the circular buffer is uninitialized and being written the first time around, or whether the circular buffer has been previously written at least once around and is now entering at least the second go around. To make this distinction, the method applies two different markers or marker values. The first marker value is used when the circular buffer has not been written more than once around. The second marker values used in the circular buffer has been written more than once around, i.e., is wrapped.

Console data in some embodiments is seven-bit ASCII (American standard code for information interchange), which means that bit 7 (the leftmost or most significant bit in an 8-bit byte) is not used and is set to zero for all console characters. In addition, one unprintable ASCII character (1A hexadecimal substitute) is reserved for use as an end-of-log log marker. The marker is used to mark the next location to be written. Writing to the circular buffer 134 is done by writing a marker 136 one byte ahead, and then writing the byte, so that the last byte written is followed by at least one marker. In this way, all writes are done in two locations containing the 1A hexadecimal character and followed by at least one byte of 1A hexadecimal. For the first pass through the circular buffer, bit 7 of the marker is set to "1". Once the state machine is circled back to location zero, bit 7 is set to "0". This allows software to recognize the data following a marker with bit 7=0 is valid start-of-buffer data, but data following a marker with bit 7=1 is uninitialized garbage.

During boot of the network device or other external device 302 being logged and the startup of the recorder 102, console logging is off in some embodiments because the logger control bit, e.g. one of the lockout control bit(s) 210 in the registers 208 in the command memory 202 (see FIG. 2), has an appropriate default or reset value. After startup, the operating system in the network device, e.g., external device 302, reads the entire first memory 130 buffer, e.g., the contents of the circular buffer 134 of the block box recorder 102, into RAM on the external device 302 to capture any previous log. That operating system then decodes the log. The buffer will either be completely full of console characters because it is run long enough to wrap around and start overwriting earlier console characters, or the buffer was only partially written. Scanning forward from address zero, and looking for a first burst of markers, the operating system will see either the marker 9A hexadecimal or the marker 1A hexadecimal. If the marker is 1A, the memory has wrapped around. If the marker is 9A, the memory did not wrap-around. Marker bursts in some embodiments are initially written eight at a time starting at zero, and then console characters are written one at a time over the burst. Once the log is decoded it is written into the second memory 132, by the operating system of the external device 302 writing appropriately to the command memory 202. Then, the logger 402 is started, by the operating system of the external device 302 writing another appropriate direction to the command memory 202, for example a specified value to the lockout control bit(s) 210. The state machine (e.g., console writer state machine 126 or one of the other state machines 306, 502) immediately writes 9A hexadecimal to the first eight locations of the circular buffer 134, invalidating the previous log and allowing the next log to begin.

The name label for the method shown in FIG. 7 is "write console character(s) into circular buffer". In a decision action 702, it is determined whether the memory writing is wrapped. If the answer in the decision action 702 is no, the memory writing is not yet wrapped, i.e., has not yet gone at least once around the circular buffer, flow proceeds to the action 704. In the action 704, the location that is one higher than the last character is written with 9A hexadecimal (or other reserved pattern of ones and zeros that differs from the expected characters). Flow then proceeds to the action 708 and proceeds as described below. If the answer in the decision action 702 is yes, the memory writing is wrapped, flow proceeds to the action 706. In the action 706, the location that is one higher than the last character is written with 1A hexadecimal (or other reserved pattern of ones and zeros that differs from the expected characters and from the reserved character for marking memory writing that is not yet wrapped). Flow then proceeds to the action 708 where the console character is written after the marker. The method is then done or complete.

With reference to FIGS. 1-7, features and advantages of various embodiments of the black box recorder 102 are discussed below. Recording a log of console activity directly into non-volatile memory is done directly by hardware of the black box recorder 102, and is immune to software failure of the external device (e.g., CPU 104 or external device 302). The black box recorder 102 robustly records down to the last byte even on power-failure occurring at any moment. Embodiments that use FRAM can have the first memory 132 written to immediately, without waiting for a page of data to accumulate for a page write as in flash memory. Embodiments that have a state machine inside a UART act as if logging a console UART port but are immune to baud rate and parity changes, as these are handled by the UART. No software modification is needed to obtain the console log, as the UART's data stream is snooped by hardware.

Writing a marker in the log ahead of valid data (e.g., as described with reference to FIG. 7) means that the last, newest characters can be determined even when power failure stops the logging process at any point. The marker is different for the first pass, so uninitialized memory can be detected. This technique does not cause proportionately more writes to occur in a few locations, as would occur with maintaining pointers or counters, which requires overwriting the same locations when new log entries are made, and this overwriting would be a concern for non-volatile memories of limited write cycles life, such as flash memory.

In some versions, the previous hardware log, in the first memory 130, is copied into the second memory 132 as a new file, so that logging hardware can be restarted with no risk of losing older information. Multiple re-tests do not wipe out failure logs. In some versions, logging is performed with hardware and is write only (i.e., into the first memory 130). Read-only software support is performed to read out of the first memory 130 as directed by software from an external CPU 104 or external device 302. Having an external device 302 only perform reads makes the recorder 102 immune to corruption due to losing power or software errors. Variations where writing from an external CPU 104 or external device 302 is allowed, through the two-clock FIFOs 120, apply specific sequences and a lockout mechanism to minimize the possibility of corruption. The use of the two clock domains and the lockout mechanism minimize or avoid timing races and hazards between logging hardware and the log reader.

In some versions, the logger can add timestamps to other information. In some embodiments, the logger 402 can record hardware events such as line power supply status changes, temperatures, voltage status, fan status, module insulation events, internal values, and so on. This information could arrive on a portion of the data logging port 124, for instance a group of parallel inputs or a parallel port with pins separate from pins for the serial bus 110. In some versions, the log memory (e.g., the first memory 130 and the second memory 132) can be split into two buffers, one to record the low-level boot up log messages, and one for high-level operating system messages, so that a complete failure log consists of the high-level operating system messages failure log followed by the next low-level boot up attempt messages. In some embodiments, the boot up log is write protected until reinitialized, to make it robust against retest attempts.

The black box recorder 102 records a log directly into non-volatile memory so that the system status leading up to a system crash is available on subsequent reboot. Various implementations in ASICs, PLDs or other integrated circuits that combine UART and black box recorder and other functions record robust logs in a simple manner with all characters captured. Some versions are low-cost, reliable, and can fail without impacting the product being monitored. Power monitoring is performed, in some embodiments. Brownout detection can be used, in some versions. Assist from outboard components such as battery or super capacitor extends the amount of writing time available for writing to the first memory 130 after a brownout detection circuit determines that the power supply voltage is dropping.

FRAM devices are well-suited to this application, as they are low-power, single supply voltage, byte addressable, fast writing and reading, and available from multiple vendors. They can be written many times. FRAM retains data for decades without power. SRAM (static random access memory, as opposed to DRAM or dynamic random access memory) with battery or super capacitor backup is an alternate technology, but has the disadvantage that these devices might lose data during a long return cycle. Flash is an alternative technology, but must be block erased, is slower to write, and has wear issues requiring a complex controller. Flash might be appropriate if the need is to store megabytes or gigabytes of static storage, but not necessarily for kilobytes. The goal in some versions is to store the last few kilobytes of console output, so as to retain a persistent history to assist in root cause determination of system failures including internal power failure and primary CPU hang or failure of a network device such as a switch, or other electronic device.

Multiple power cycles could cause problems for recorder 102. There could be an initial failure in a customer environment where valuable console information is saved in FRAM in the first memory 130. If there are multiple power cycles, perhaps while attempting to recover the network device that is being logged, original saved data could be lost with only later power cycle information captured. To deal with this problem, in some embodiments the console logger (e.g., logger 402 of FIG. 4, or console writer state machine 126 of FIG. 1) is off (e.g., not cycling and logging, or disabled/not enabled using a lockout mechanism) at boot up. At startup, operating system software in the network device or other external device is expected to transfer previous logs, for example from the first memory 130 to the second memory 132, or from the first memory 130 to the external device. This could be done using one or a series of commands to the registers 208 and/or the command FIFO 204 in the command memory 202 of the black box recorder 102, to which the operating system software in the network device or other external device writes. Only after this is the console logger enabled, for example using another command or series of commands that the operating system software in the network device or other external device writes to the registers 208 and/or the command FIFO 204 in the command memory 202. FRAM writes each byte into non-volatile storage as soon as the last bit of the byte is clocked in, in some embodiments. Byte writes are robust to system failures. However, random system power failure could cause writing to be stopped in the middle of a multi-byte transfer. This means that the data structures being written should be decodable after a failure of any byte write.

Figure 8:
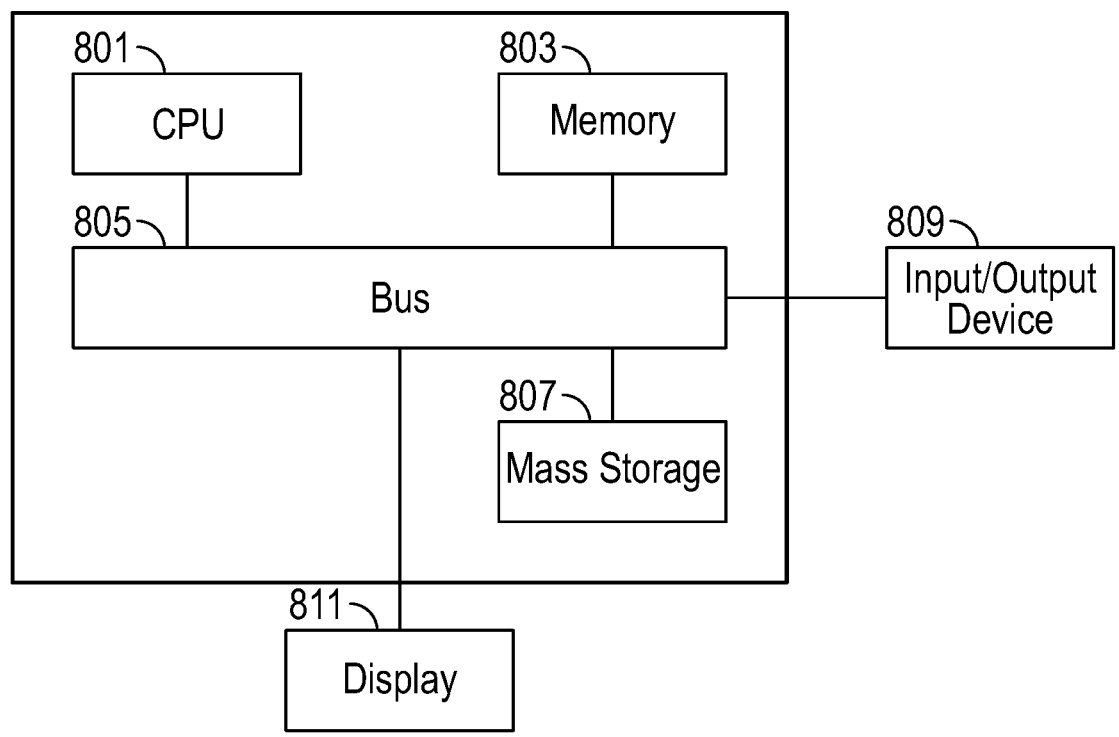
FIG. 8 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 8 is an illustration showing an exemplary computing device which may implement the embodiments described herein. The computing device of FIG. 8 may be used to perform embodiments of the functionality for an external device with a CPU that could access the black box recorder in accordance with some embodiments. The computing device includes a central processing unit (CPU) 801, which is coupled through a bus 805 to a memory 803, and mass storage device 807. Mass storage device 807 represents a persistent data storage device such as a disc drive, which may be local or remote in some embodiments. The mass storage device 807 could implement a backup storage, in some embodiments. Memory 803 may include read only memory, random access memory, etc. Applications resident on the computing device may be stored on or accessed via a computer readable medium such as memory 803 or mass storage device 807 in some embodiments. Applications may also be in the form of modulated electronic signals modulated accessed via a network modem or other network interface of the computing device. It should be appreciated that CPU 801 may be embodied in a general-purpose processor, a special purpose processor, or a specially programmed logic device in some embodiments.

Display 811 is in communication with CPU 801, memory 803, and mass storage device 807, through bus 805. Display 811 is configured to display any visualization tools or reports associated with the system described herein. Input/output device 809 is coupled to bus 805 in order to communicate information in command selections to CPU 801. It should be appreciated that data to and from external devices may be communicated through the input/output device 809. CPU 801 can be defined to execute the functionality described herein to enable the functionality described with reference to FIGS. 1-7. The code embodying this functionality may be stored within memory 803 or mass storage device 807 for execution by a processor such as CPU 801 in some embodiments. The operating system on the computing device may be MS-WINDOWS™, UNIX™, LINUX™, iOS™, CentOS™, Android™, Redhat Linux™, z/OS™, or other known operating systems. It should be appreciated that the embodiments described herein may also be integrated with a virtualized computing system implemented with physical computing resources.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. An apparatus for recording data received in serial form, comprising:
    a data logging port configured to receive the data in serial form;
    an external access port;
    a first memory;
    a command processor coupled to the external access port and configured to read the first memory in accordance with a command placed in the command processor through the external access port;
    selection logic configured to couple the first memory to the data logging port and the external access port, the selection logic configured to lockout access to the first memory based, at least in part, on the command in the command processor, wherein the selection logic is configured to provide access to the first memory only through the data logging port while locking out access to the first memory through the external access port and command processor, and is further configured to provide access to the first memory only through the external access port and command processor while locking out access to the first memory through the data logging port; and
    a state machine executing on a processor internal to the apparatus, wherein the state machine is configured to control the writing of the data, received in serial form through the data logging port, to the first memory.

2. The apparatus of claim 1, wherein the command processor includes at least one FIFO (first-in first-out) memory.

3. The apparatus of claim 1, wherein the state machine controls the writing of the data into the first memory through the data logging port while the selection logic has locked out access to the first memory via the external access port and the command processor, and wherein the external access port and the command processor read the first memory when the selection logic has locked out access to the first memory via the data logging port.

4. The apparatus of claim 1, wherein the first memory includes a circular buffer with a marker.

5. The apparatus of claim 1, further comprising:
    a second memory, with the state machine configured to write data from the first memory to the second memory.

6. The apparatus of claim 1, further comprising a marker for the first memory that indicates when the first memory is uninitialized and where most recent data is located in the first memory.

7. The apparatus of claim 1, wherein the external access port and a portion of the command memory are in a first clock domain and the data logging port, the state machine, the first memory and a further portion of the command memory are in a second, differing clock domain.

8. A recorder, comprising:
    an external access port, a data logging port, a first memory, and a command memory coupled to the external access port, the first memory coupled to the data logging port and the external access port through selection logic configured to lockout access to the first memory based, at least in part, on input from the command processor;
    a logger, that writes data, received through the data logging port, to the first memory; and
    a lockout mechanism enables only the logger access to the first memory to write the data to the first memory while locking out access to the first memory through the external access port, and the lockout mechanism enables only read access to the first memory through the external access port and the command memory while locking out access to the first memory by the logger writing the data to the first memory, the lockout mechanism responsive to values in the command memory.

9. The recorder of claim 8, further comprising:
    a UART (universal asynchronous receiver transmitter) arranged to receive the data in serial form through the data logging port, wherein a state machine implementing at least a portion of or cooperating with the lockout mechanism and the logger is internal to the UART.

10. The recorder of claim 8, wherein a state machine implements at least a portion of the logger and the lockout mechanism, and wherein the state machine, the logger, the lockout mechanism, the external access port, the data logging port, and the command memory are implemented in an application-specific integrated circuit or a programmable logic device.

11. The recorder of claim 8, wherein the command memory comprises:
    at least one FIFO (first in first out) memory; and
    a plurality of registers including a register arranged to hold the values in the command memory to which the lockout mechanism is responsive.

12. The recorder of claim 8, wherein the first memory includes a serial access ferroelectric random access memory (FRAM), and further comprising a second memory that includes flash memory.

13. The recorder of claim 8, wherein:
    the first memory includes a circular buffer configured to record character data received by a first portion of the data logging port; and
    the first memory includes a portion configured to record status information received by a second portion of the data logging port.

14. The recorder of claim 8, wherein the external access port and the command memory are configured to read and write the first memory when enabled by the lockout mechanism.

15. A method performed by a recorder for recording data received in serial form, comprising:
- receiving the data, in serial form, into a data logging port;
- writing the data received through the data logging port into a selection module and a first memory, with the selection module providing access to the first memory only through the data logging port while read access to the first memory through an external access port and a command memory is locked out by the selection module, in accordance with a first value stored in the command memory; and
- reading the first memory, via the selection module and the external access port and the command memory, with the selection module providing access to the first memory only through the external access port while writing the data received through the data logging port into the first memory is locked out by the selection module, in accordance with a second value stored in the command memory.

16. The method of claim 15, further comprising:
- writing a first marker into a circular buffer in the first memory, to indicate uninitialized memory; and
- writing a second marker into the circular buffer in the first memory, to indicate the data is written into the circular buffer.

17. The method of claim 15, further comprising:
- writing a first command having the second value into a register in the command memory; and
- writing a second command into a first FIFO (first-in first-out) memory in the command memory, so as to enable reading the first memory, wherein reading the first memory via the command memory includes reading a second FIFO memory in the command memory.

18. The method of claim 15, further comprising:
- receiving status information through a first portion of the data logging port separate from a second portion of the data logging port that receives the data; and writing the status information into the first memory.

19. The method of claim 15, further comprising:
- writing contents of the first memory into a second memory, wherein the first memory and the second memory are differing types of nonvolatile memory, and the second memory is larger than the first memory.

20. The method of claim 15, wherein:
- the data is received in serial form through the data logging port at a first baud rate; and the data is written into the first memory in serial form at a second baud rate, independent of the first baud rate.

* * * * *